(12) United States Patent
Lee (10) Patent No.: US 12,311,831 B2
(45) Date of Patent: May 27, 2025

(54) HEADLAMP LEVELING DEVICE AND HEADLAMP LEVELING METHOD FOR VEHICLE

(71) Applicant: HYUNDAI MOBIS CO., LTD., Seoul (KR)

(72) Inventor: Ji Eung Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 456 days.

(21) Appl. No.: 17/807,089

(22) Filed: Jun. 15, 2022

(65) Prior Publication Data
US 2022/0410792 A1 Dec. 29, 2022

(30) Foreign Application Priority Data
Jun. 29, 2021 (KR) .................. 10-2021-0084963

(51) Int. Cl.
| | | |
|---|---|---|
| B60Q 1/076 | (2006.01) | |
| B60Q 1/068 | (2006.01) | |
| H02P 7/03 | (2016.01) | |
| H05B 47/14 | (2020.01) | |
| B60Q 1/115 | (2006.01) | |

(52) U.S. Cl.
CPC ........... *B60Q 1/076* (2013.01); *B60Q 1/0686* (2013.01); *H02P 7/03* (2016.02); *H05B 47/14* (2020.01); *B60Q 1/115* (2013.01)

(58) Field of Classification Search
CPC ...... B60Q 1/076; B60Q 1/0686; H05B 47/14; F21S 41/60; H02P 7/03
See application file for complete search history.

(56) References Cited

U.S. PATENT DOCUMENTS

| | | | |
|---|---|---|---|
| 2001/0033494 A1 | 10/2001 | Denley | |
| 2012/0206050 A1* | 8/2012 | Spero | ................... H05B 45/395 |
| | | | 315/152 |
| 2019/0109551 A1 | 4/2019 | Saw | |
| 2020/0266740 A1 | 8/2020 | Saw | |

FOREIGN PATENT DOCUMENTS

CN 101 402 331 4/2009

OTHER PUBLICATIONS

Extended European Search Report dated Nov. 14, 2022 issued in EP Application No. 22178830.0.
English Language Abstract of CN 101 402 331 published Apr. 8, 2009.

* cited by examiner

*Primary Examiner* — Joseph L Williams
(74) *Attorney, Agent, or Firm* — DLA PIPER LLP US (57) ABSTRACT

A headlamp leveling device and a headlamp leveling method. The headlamp leveling device may include a control voltage generator that generates a control voltage based on a width of a pulse, a control integrated circuit (IC) that controls a rotation direction of a motor by comparing a voltage level of a feedback voltage with a voltage level of the control voltage, a shaft position detector that generates a voltage corresponding to a position of the shaft moving with rotation of the motor, and a feedback voltage generator that generates the feedback voltage based on a voltage generated to correspond to the position of the shaft.

17 Claims, 3 Drawing Sheets

HEADLAMP LEVELING DEVICE AND HEADLAMP LEVELING METHOD FOR VEHICLE

CROSS-REFERENCE TO RELATED APPLICATION

This application claims the benefit of priority to Korean Patent Application No. 10-2021-0084963, filed in the Korean Intellectual Property Office on Jun. 29, 2021, the entire contents of which are incorporated herein by reference.

TECHNICAL FIELD

The present disclosure relates to a headlamp leveling device and a headlamp leveling method for a vehicle.

BACKGROUND

Generally, a headlamp for a vehicle is installed at a front end of the vehicle and emits light forward to ensure a driver's view.

Recently, a device for adjusting a light-illumination angle of the headlamp has been developed so as to change an illuminating distance of light emitted toward the front of the vehicle in a stepwise manner to ensure driving convenience and visibility.

A method of controlling the light-illumination angle of the headlamp may be divided into a method in which a driver adjusts the light-illumination angle with a switch installed in a vehicle and a method in which the vehicle automatically adjusts the light-illumination angle using a vehicle height sensor.

The method of adjusting the light-illumination angle of the headlamp by using a switch having a mechanical configuration installed in the vehicle causes an increase in costs of a vehicle or a headlamp leveling device because a switch for adjusting the light-illumination angle needs be installed in the vehicle.

SUMMARY

The present disclosure has been made to solve the above-mentioned problems occurring in the prior art while advantages achieved by the prior art are maintained intact.

An aspect of the present disclosure provides a headlamp leveling device and a headlamp leveling method capable of adjusting a light-illumination angle of a headlamp using a pulse width control method used in a vehicle system.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a headlamp leveling device includes a control voltage generator that generates a control voltage based on a width of a pulse, a control integrated circuit (IC) that controls a rotation direction of a motor by comparing a voltage level of a feedback voltage with a voltage level of the control voltage, a shaft position detector that generates a voltage corresponding to a position of the shaft moving with rotation of the motor, and a feedback voltage generator that generates the feedback voltage based on the voltage generated to correspond to the position of the shaft.

According to an embodiment, the control voltage generator may increase the voltage level of the control voltage when the width of the pulse increases and decrease the voltage level of the control voltage when the width of the pulse decreases.

According to an embodiment, the control voltage generator may include a voltage applying device that outputs a power voltage based on the pulse, a voltage smoothing device that smooths the voltage output from the voltage applying device, and a hysteresis device that outputs, as the control voltage, a voltage obtained by adding a hysteresis component to a voltage provided from the voltage smoothing device.

According to an embodiment, the voltage applying device may output the power voltage in a specific period of the pulse.

According to an embodiment, the voltage applying device may include a transistor configured to receive the pulse at a gate of the transistor and receive the power voltage at a drain of the transistor, and a resistor connected to a source of the transistor at one end of the resistor and connected to a ground terminal at another end of the resistor, and a node, to which the source of the transistor and the one end of the resistor are connected may be an output terminal of the voltage applying device.

According to an embodiment, the voltage smoothing device may include a first resistor connected to an output terminal of the voltage applying device at one end of the first resistor, and a first capacitor connected to another end of the first resistor at one end of the first capacitor.

According to an embodiment, the hysteresis device may include a resistor that receives a smoothed voltage from the voltage smoothing device at one end of the hysteresis device and outputs the control voltage at another end of the hysteresis device.

According to an embodiment, the control IC may control the motor so as to rotate in a first direction when the voltage level of the control voltage is higher than a voltage level of the feedback voltage, and control the motor so as to rotate in a second direction when the voltage level of the control voltage is lower than the voltage level of the feedback voltage.

According to an embodiment, the first direction and the second direction are opposite to each other.

According to an embodiment, the control IC may include a comparator that compares the voltage level of the control voltage and the voltage level of the feedback voltage; and a motor driver that controls rotation of the motor based on a result of comparison by the comparator.

According to an embodiment, the shaft position detector may generate a voltage with a higher voltage level as the shaft moves in a first direction, and generate a voltage with a lower voltage level as the shaft moves to a second direction.

According to an embodiment, the shaft position detector may include a variable resistor having a resistance value that varies according to movement of the shaft, a power voltage may be applied to one end of the variable resistor, and the variable resistor may be connected to a ground terminal at another end of the variable resistor.

According to an embodiment, the control voltage generator may include a second resistor that receives the voltage generated by the shaft position detector at one end of the second resistor, and a second capacitor connected to the other end of the second resistor at one end of the second capacitor and connected to a ground terminal at another end of the second capacitor, and the feedback voltage may be output at a node to which the another end of the second resistor and the one end of the second capacitor are connected.

According to an embodiment, the second resistor may have a resistance value corresponding to a resistance value of the first resistor, and the second capacitor may have a capacitance value corresponding to a capacitance value of the first capacitor.

According to another aspect of the present disclosure, a headlamp leveling method includes generating a control voltage based on a pulse provided from a vehicle system, generating a feedback voltage according to a position of a shaft, controlling rotation of a motor by comparing a voltage level of the feedback voltage and a voltage level of the control voltage, and allowing the position of the shaft to be changed, according to the rotation of the motor.

According to an embodiment, the headlamp leveling method may further include allowing a light-illumination angle of a headlamp to be changed, according to the position of the shaft.

According to an embodiment, the generating of the control voltage may include generating a voltage based on a high period of the pulse, smoothing the voltage by removing variability of the voltage, and outputting, as the control voltage, a voltage obtained by adding a hysteresis component to the voltage that has been smoothed.

According to an embodiment, the controlling of the rotation of the motor may include rotating the motor in a first direction when the voltage level of the control voltage is higher than the voltage level of the feedback voltage, and rotating the motor in a second direction when the voltage level of the control voltage is lower than the voltage level of the feedback voltage.

According to an embodiment, the first direction and the second direction may be opposite to each other.

According to an embodiment, the generating of the feedback voltage may include increasing the voltage level of the feedback voltage as the shaft moves in a first direction, and decreasing the voltage level of the feedback voltage as the shaft moves in a second direction, and the first direction and the second direction may be opposite to each other.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 and 2.

Figure 1:
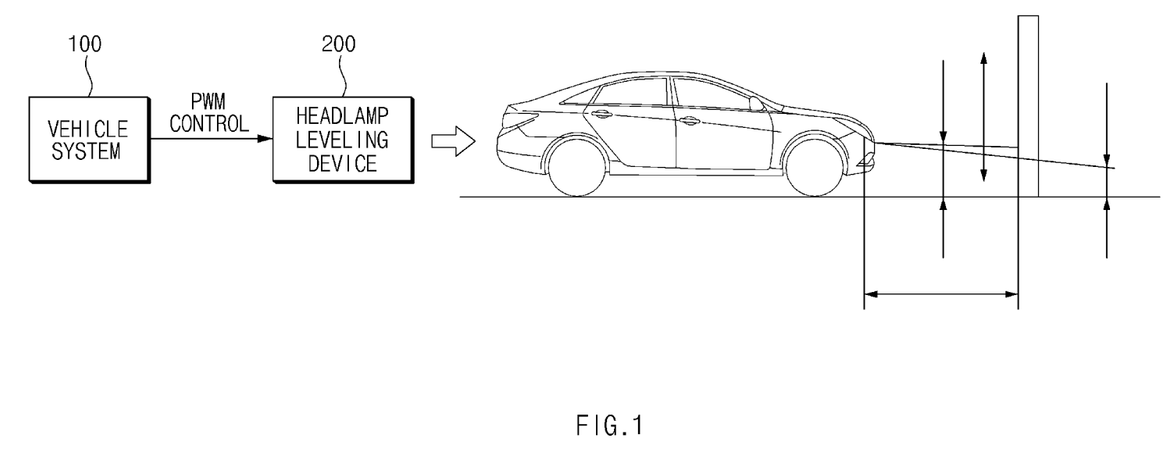
FIG. 1 is a diagram illustrating a configuration of a vehicle including a headlamp leveling device for a vehicle according to an embodiment of the present disclosure.

FIG. 1 is a diagram illustrating a configuration of a vehicle including a headlamp leveling device for a vehicle according to an embodiment of the present disclosure;

Referring to FIG. 1, a vehicle system 100 and a headlamp leveling device 200 according to an embodiment of the present disclosure may be implemented inside a vehicle. In this case, the vehicle system 100 and the headlamp leveling device 200 may be integrally formed with control units inside the vehicle, and may be implemented as separate devices and connected to the control units of the vehicle by a separate connection means.

Referring to FIG. 1, the vehicle according to an embodiment of the present disclosure may include the vehicle system 100 and the headlamp leveling device 200.

The vehicle system 100 may be a system capable of controlling a plurality of electrical components installed in the vehicle.

For example, the vehicle system 100 may include an integrated central control unit (ICU).

In this case, the integrated central control unit (ICU) may control the electrical components by generating a pulse-type signal using power stored in a battery and providing the pulse-type signal to the electrical components. The electrical components may include the headlamp leveling device 200.

In addition, the vehicle system 100 may include an AVNT (Audio/Video/Navigation/Telematics) system.

In this case, the AVNT system may provide various conveniences to vehicle occupants by integrating electrical devices including audio devices, video devices, navigation devices, telematics devices, and the like installed in the vehicle.

The AVNT system may use a signal in the form of a pulse when controlling an electric device.

The vehicle system 100 according to an embodiment of the present disclosure may include a system capable of controlling electrical components or electric devices installed in the vehicle using a pulse width modulation method.

The headlamp leveling device 200 may control a light-illumination angle of a headlamp based on the control according to the pulse width modulation method of the vehicle system 100.

For example, the headlamp leveling device 200 may receive continuous pulses from the vehicle system 100, and may adjust the light-illumination angle of the headlamp according to a change in pulse width.

In more detail, for example, the headlamp leveling device 200 may adjust the light-illumination angle of the headlamp according to the ratio of the high period to the low period of a pulse received from the vehicle system 100.

The headlamp leveling device 200 may increase the light-illumination angle of the headlamp when the high period of the pulse is greater than the low period, and decrease the light-illumination angle of the headlamp when the high period of the pulse is smaller than the low period.

Figure 2:
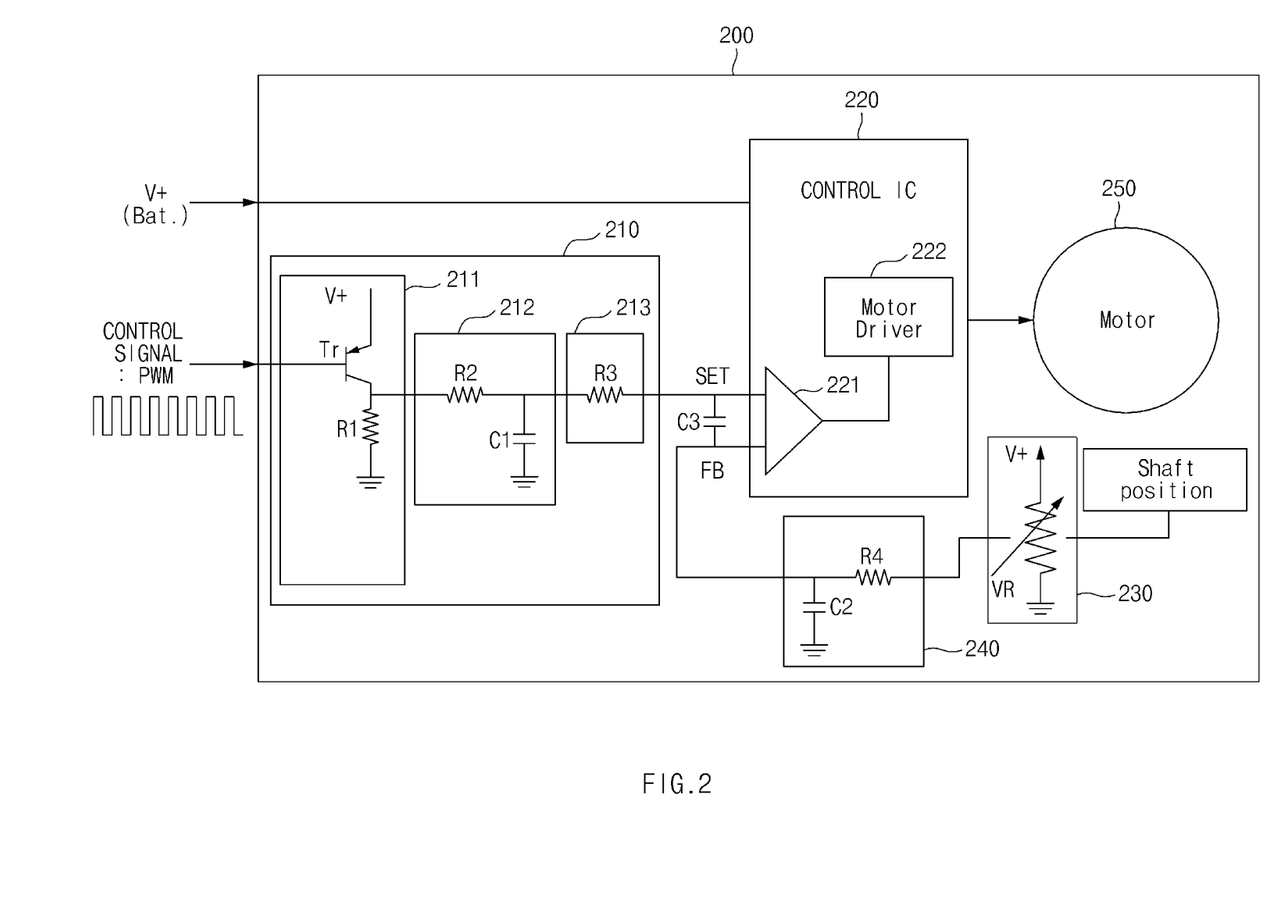
FIG. 2 is a diagram illustrating a configuration of a headlamp leveling device for a vehicle according to an embodiment of the present disclosure.

FIG. 2 is a diagram illustrating a configuration of a headlamp leveling device for a vehicle according to an embodiment of the present disclosure;

Referring to FIG. 2, the headlamp leveling device 200 may include a control voltage generator 210, a control IC 220, a shaft position detector 230, a feedback voltage generator 240, and a motor 250.

The control voltage generator 210 may generate a control voltage SET based on a pulse continuously provided from the vehicle system 100.

For example, the control voltage generator 210 may increase a voltage level of the control voltage SET when the width of a pulse (e.g., the high period of the pulse) increases.

Meanwhile, the control voltage generator 210 may decrease the voltage level of the control voltage SET when the pulse width (e.g., the high period of the pulse) decreases.

In this case, when the pulse width increases, that is, when the width of the high period of the pulse increases, the width of the low period of the pulse may decrease.

Also, the control voltage generator 210 may maintain the voltage level of the control voltage SET when the pulse width does not increase or decrease, that is, when the pulse width is maintained without being changed.

The control voltage generator 210 may include a voltage applying device 211, a voltage smoothing device 212, and a hysteresis device 213.

The voltage applying device 211 may apply a power voltage V+ to a node only during the high period among the high period and the low period of the pulse. In this case, the power voltage V+ may be a voltage stored in a battery.

The voltage applying device 211 may include a transistor Tr and a first resistor R1.

The transistor Tr may receive a pulse at a gate of the transistor Tr and receive the power voltage V+ at a drain of the transistor Tr, and may be connected to one end of the first resistor R1 at a source of the transistor Tr.

The first resistor R1 may connected to the source of the transistor Tr at one end of the first resistor R1 and connected to a ground terminal at the other end of the first resistor R1.

An operation of the voltage applying device 211 configured as described above will be described as an example.

The transistor Tr may be turned on when a pulse input to the gate is in a high period.

The transistor Tr, which has been turned-on, may transfer the power voltage V+ applied to the drain to the source.

Accordingly, the power voltage V+ may be applied to the node to which the transistor Tr and the first resistor R1 are connected during the high period of the pulse.

The transistor Tr may be turned off when the pulse input to the gate is in a low period.

The transistor Tr which has been turned-off may block the supply of the power voltage V+ to the one end of the first resistor R1.

That is, the voltage applying device 211 may apply the power voltage V+ to the node to which the transistor Tr and the first resistor R1 are connected only during the high period of the pulse.

As a result, when a pulse including a high period and a low period is continuously provided to the voltage applying device 211, the voltage level at one end of the first resistor R1 may be high only when the pulse is in the high period, so that the voltage applied to the first resistor R1 may have variability.

The voltage smoothing device 212 may remove variations in the voltage provided from the voltage applying device 211, that is, the voltage applied to one end of the first resistor R1.

The voltage smoothing device 212 may be implemented as a low-pass filter.

For example, the voltage smoothing device 212 may include a second resistor R2 and a first capacitor C1.

One end of the first resistor R1 may be connected to one end of the second resistor R2, and one end of the first capacitor C1 may be connected to the other end of the second resistor R2.

The first capacitor C1 may be connected to the other end of the second resistor R2 at one end and connected to a ground terminal at the other end.

The hysteresis device 213 may provide a voltage provided from the voltage smoothing device 212, that is, a voltage having a smooth voltage level from which variability has been removed, to the control IC 220 as the control voltage SET.

The hysteresis unit 213 may add a hysteresis component to the control voltage SET to be provided to the control IC 220.

That is, the hysteresis device 213 may be disposed between the voltage smoothing device 212 and the control IC 220 to delay reflection of a change in level of the voltage, output from the voltage smoothing device 12, to the control voltage SET to be provided to the control IC 220, thus preventing an instantaneous change in level of the power voltage V+ from affecting the level of the control voltage SET.

The hysteresis device 213 may include a third resistor R3.

The third resistor R3 may be connected to one end of the first capacitor C1 at one end of the third resistor R3, and connected to an input terminal of the control IC 220, to which the control voltage SET is input, at the other end of the third resistor R3.

The control IC 220 may rotate the motor 250 by comparing the control voltage SET and the feedback voltage FB.

For example, the control IC 220 may rotate the motor 250 in a first direction when the voltage level of the control voltage SET is higher than the voltage level of the feedback voltage FB.

On the other hand, when the voltage level of the control voltage SET is lower than the voltage level of the feedback voltage FB, the control IC 220 may rotate the motor 250 in a second direction.

In this case, the first direction may be opposite to the second direction.

The control IC 220 may include a comparator 221 and a motor driver 22.

The comparator 221 may compare the voltage level of the control voltage SET and the voltage level of the feedback voltage FB, and provide a result of the comparison to the motor driver 222.

For example, the comparator 221 may provide a signal with a first voltage level to the motor driver 222 when the voltage level of the control voltage SET is higher than the voltage level of the feedback voltage FB.

On the other hand, the comparator 221 may provide a signal with a second voltage level to the motor driver 222 when the voltage level of the control voltage SET is lower than the voltage level of the feedback voltage FB.

In this case, the first voltage level may be higher than the second voltage level.

The motor driver 222 may provide a signal or voltage capable of controlling a rotation direction of the motor 250 to the motor 250 according to a level of a signal provided from the comparator 221.

For example, when the signal with the first voltage level is provided from the comparator 221, the motor driver 222 may provide a signal or voltage capable of rotating the motor 250 in the first direction to the motor 250.

When the signal with the second voltage level is provided from the comparator 221, the motor driver 222 may provide a signal or voltage capable of rotating the motor 250 in the second direction to the motor 250.

The shaft position detector 230 may generate a voltage whose voltage level varies according to a position of a shaft.

In this case, the shaft may be a mechanical device for changing the light-illumination angle of the headlamp by moving in the first direction and the second direction according to the rotation direction of the motor 250.

For example, the shaft position detector 230 may provide the feedback voltage generator 240 with a voltage with a higher level as the shaft moves in the first direction.

The shaft position detector 230 may provide the feedback voltage generator 240 with a voltage with a lower level as the shaft moves in the second direction.

The shaft position detector 230 may include a variable resistor VR.

The variable resistor VR may receive a power voltage V+ at one end and be connected to a ground terminal at the other end.

In this case, the variable resistor VR may have a resistance value corresponding to the position of the shaft which has moved in the first direction or the second direction, and may provide a voltage corresponding to the resistance value to the feedback voltage generator 240.

The feedback voltage generator 240 may provide a voltage provided from the shaft position detector 230 to the control IC 220 as the feedback voltage FB.

In this case, the feedback voltage generator 240 may be implemented by modeling the voltage smoothing device 212. Further, the feedback voltage generator 240 may be configured to allow a voltage, provided from the shaft position detector 230, to be delayed by a time required to remove the variability of voltage in the voltage smoothing device 212 and then provided to the control IC 220 as the feedback voltage FB to match the timing of changes between the control voltage SET and the feedback voltage FB.

The feedback voltage generator 240 may include a fourth resistor R4 and a second capacitor C2.

The fourth resistor R4 may receive a voltage provided from the shaft position detector 230 at one end of the fourth resistor R4, and may be connected to one end of the second capacitor C2 at the other end of the fourth resistor R4.

The second capacitor C2 may be connected to the other end of the fourth resistor R4 at one end of the second capacitor C2 and connected to a ground terminal at the other end of the second capacitor C2.

In this case, a node to which the other end of the fourth resistor R4 and the one end of the second capacitor C2 are connected may be a node to which the feedback voltage FB is output, and may be connected to an input terminal to which the feedback voltage FB of the control IC 220 is input.

The resistance value of the fourth resistor R4 and the capacitance value of the second capacitor C2 may respectively correspond to the resistance value of the second resistor R2 and the capacitance value of the first capacitor C2, the second resistor R2 and the first capacitor C2 constituting the voltage smoothing device 212.

In this case, the third capacitor C3 may be connected between an input terminal of the control IC 220 receiving the control voltage SET and an input terminal of the control IC 220 receiving the feedback voltage FB.

The operation of the headlamp leveling device 200 according to an embodiment of the present disclosure configured as described above will be described below.

When a width (e.g., a high period) of a pulse provided from the vehicle system 100 increases, the control voltage generator 210 may increase the voltage level of the control voltage SET.

The control IC 220 may rotate the motor 250 in the first direction by comparing the control voltage SET having an increased voltage level and the feedback voltage FB.

The motor 250 may be rotated in the first direction to move the shaft in the first direction.

As the shaft moves in the first direction, the level of the voltage provided from the shaft position detector 230 may increase.

The voltage provided from the shaft position detector 230 may be provided to the control IC 220 through the feedback voltage generator 240 as the feedback voltage FB.

The control IC 220 may compare the control voltage SET and the feedback voltage FB and when the control voltage SET is higher than the voltage level of the feedback voltage FB, further rotate the motor 250 in the first direction.

As a result, the control IC 220 may rotate the motor 250 in the first direction until the voltage level of the feedback voltage FB is equal to the control voltage SET.

Meanwhile, When a width (e.g., a high period) of a pulse provided from the vehicle system 100 decreases, the control voltage generator 210 may decrease the voltage level of the control voltage SET.

The control IC 220 may rotate the motor 250 in the second direction by comparing the control voltage SET having a decreased voltage level and the feedback voltage FB.

The motor 250 may be rotated in the second direction to move the shaft in the second direction.

As the shaft moves in the second direction, the level of the voltage provided from the shaft position detector 230 may decrease.

The voltage provided from the shaft position detector 230 may be provided to the control IC 220 through the feedback voltage generator 240 as the feedback voltage FB.

The control IC 220 may compare the control voltage SET and the feedback voltage FB and when the control voltage SET is lower than the voltage level of the feedback voltage FB, further rotate the motor 250 in the second direction.

As a result, the control IC 220 may rotate the motor 250 in the second direction until the voltage level of the feedback voltage FB is equal to the control voltage SET.

As described above, the headlamp leveling device 200 according to an embodiment of the present disclosure may receive a pulse having a variable width from the vehicle system 100 and adjust the light-illumination angle of the headlamp by adjusting the direction and amount of rotation of the motor 250 based on the pulse width and moving the shaft.

In this case, the headlamp leveling device 200 according to an embodiment of the present disclosure may prevent a malfunction caused by a time required for the voltage smoothing device 212 to smooth a voltage by disposing the feedback voltage generator 240, implemented by modeling the voltage smoothing device 212 that generates the control voltage SET, between the shaft position detector 230 and the control IC 220.

In addition, in the headlamp leveling device 200 according to an embodiment of the present disclosure may prevent a malfunction caused when the voltage level of the control voltage SET is changed due to a change in the power voltage V+ by disposing the hysteresis device 213 between the voltage smoothing device 212 and the control IC 220.

Figure 3:
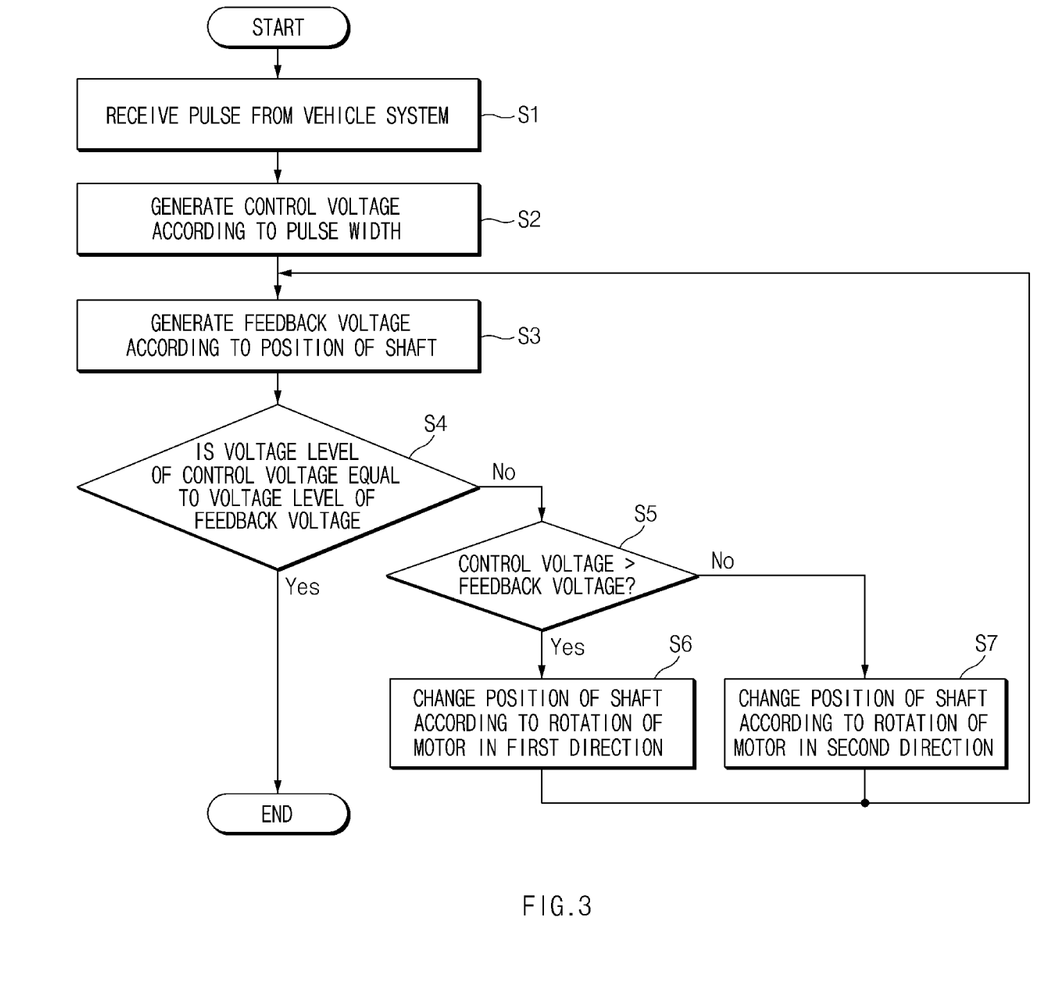
FIG. 3 is a flowchart illustrating a headlamp leveling method of a vehicle according to an embodiment of the present disclosure.

FIG. 3 is a flowchart illustrating a headlamp leveling method of a vehicle according to an embodiment of the present disclosure.

Referring to FIG. 3, the headlamp leveling method according to an embodiment of the present disclosure may a pulse receiving operation S1, a control voltage generating operation S2, a feedback voltage generating operation S3, a first comparing operation S4, a second comparing operation S5, a first motor rotating operation S6, and a second motor rotating operation S7.

The pulse receiving operation S1 may include receiving a pulse with a variable width from a vehicle system (e.g., ICU, AVNT).

In this case, the pulse may include a high period and a low period, and the width of the pulse may correspond to the width of the high period.

The control voltage generating operation S2 may include generating the control voltage SET corresponding to the size of the width of the received pulse.

For example, the control voltage generating operation S2 may include generating the control voltage SET having a higher voltage level as the width of the pulse, that is, the width of the high period of the pulse increases.

Meanwhile, the control voltage generating operation S2 may include generating the control voltage SET having a lower voltage level as the width of the pulse, that is, the width of the high period of the pulse decreases.

The control voltage generating operation S2 may include generating a voltage based on the width of the high period of the pulse, smoothing a level of the voltage by removing variability of the generated voltage, and outputting, as the control voltage SET, a voltage obtained by adding a hysteresis component to the voltage that has been smoothed.

The feedback voltage generating operation S3 may include generating the feedback voltage FB according to the position of a shaft.

In this case, the shaft may move in the first direction or the second direction according to the rotation direction of the motor 250. The first direction and the second direction may be opposite to each other.

For example, the feedback voltage generating operation S3 may include generating the feedback voltage FB with a higher voltage level as the shaft moves in the first direction.

Meanwhile, the feedback voltage generating operation S3 may include generating the feedback voltage FB with a lower voltage level as the shaft moves in the second direction.

The first comparison operation S4 may include comparing the voltage level of the control voltage SET and the voltage level of the feedback voltage FB.

For example, the first comparison operation S4 may include performing comparison as to whether the voltage level of the control voltage SET and the voltage level of the feedback voltage FB are equal to each other.

When it is determined in the first comparison operation S4 that the voltage level of the control voltage SET and the voltage level of the feedback voltage FB are equal to each other (Yes), the headlamp leveling method for a vehicle according to the embodiment of the present disclosure may be terminated.

On the other hand, when it is determined in the first comparison operation S4 that the voltage level of the control voltage SET and the voltage level of the feedback voltage FB are not equal to each other (No), the second comparison operation S5 may be performed.

The second comparison operation S5 may include comparing the voltage level of the control voltage SET and the voltage level of the feedback voltage FB.

For example, the second comparison operation S5 may include determining which voltage level is higher among the voltage level of the control voltage SET and the voltage level of the feedback voltage FB.

In the second comparison operation S5, when the voltage level of the control voltage SET is higher than the voltage level of the feedback voltage FB (Yes), the first motor rotation operation S6 may be performed.

In the second comparison operation S5, when the voltage level of the control voltage SET is lower than the voltage level of the feedback voltage FB (No), the second motor rotation operation S7 may be performed.

The first motor rotation operation S6 may include rotating the motor 250 in the first direction to move the shaft in the first direction.

The second motor rotation operation S7 may include rotating the motor 250 in the second direction to move the shaft in the second direction.

After the first and second motor rotation operations S6 and S7 have been performed, the feedback voltage generation operation S3 for generating the feedback voltage FB according to a position to which the shaft has moved may be performed again.

That is, the headlamp leveling method for a vehicle according to an embodiment of the present disclosure may include changing the voltage level of the control voltage according to the width of the pulse and rotating the motor until the changed voltage level of the control voltage and the voltage level of the feedback voltage are equal to each other to rotate the position of the shaft. In this case, the voltage level of the feedback voltage may be changed according to the position of the shaft.

The above description is merely illustrative of the technical idea of the present disclosure, and various modifications and variations may be made without departing from the essential characteristics of the present disclosure by those skilled in the art to which the present disclosure pertains.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

The present technology has the advantage of reducing the costs of the vehicle and the headlamp leveling device by removing a switch for adjusting the light-illumination angle of the headlamp from the vehicle.

In addition, various effects may be provided that are directly or indirectly understood through the disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A headlamp leveling device, comprising:
a control voltage generator configured to generate a control voltage based on a width of a pulse;
a control integrated circuit (IC) configured to control a rotation direction of a motor by comparing a voltage level of a feedback voltage with a voltage level of the control voltage;
a shaft position detector configured to generate a voltage corresponding to a position of the shaft moving with rotation of the motor; and
a feedback voltage generator configured to generate the feedback voltage based on the voltage generated to correspond to the position of the shaft,
wherein the control IC is configured to:
control the motor so as to rotate in a first direction when the voltage level of the control voltage is higher than a voltage level of the feedback voltage, and
control the motor so as to rotate in a second direction when the voltage level of the control voltage is lower than the voltage level of the feedback voltage, and
wherein the control IC includes:
a comparator configured to compare the voltage level of the control voltage and the voltage level of the feedback voltage, and
a motor driver configured to control rotation of the motor based on a result of comparison by the comparator.

2. The headlamp leveling device of claim 1, wherein the control voltage generator is configured to:
increase the voltage level of the control voltage when the width of the pulse increases, and
decrease the voltage level of the control voltage when the width of the pulse decreases.

3. The headlamp leveling device of claim 2, wherein the control voltage generator includes:
a voltage applying device configured to output a power voltage based on the pulse,
a voltage smoothing device configured to smooth the voltage output from the voltage applying device, and
a hysteresis device configured to output, as the control voltage, a voltage obtained by adding a hysteresis component to a voltage provided from the voltage smoothing device.

4. The headlamp leveling device of claim 3, wherein the voltage applying device is configured to output the power voltage the power voltage in a specific period of the pulse.

5. The headlamp leveling device of claim 3, wherein the voltage applying device includes:
a transistor configured to receive the pulse at a gate of the transistor and receive the power voltage at a drain of the transistor, and
a resistor connected to a source of the transistor at one end of the resistor and connected to a ground terminal at another end of the resistor,
wherein a node, to which the source of the transistor and the one end of the resistor are connected is an output terminal of the voltage applying device.

6. The headlamp leveling device of claim 3, wherein the voltage smoothing device includes:
a first resistor connected to an output terminal of the voltage applying device at one end of the first resistor, and a first capacitor connected to another end of the first resistor at one end of the first capacitor.

7. The headlamp leveling device of claim 6, wherein the control voltage generator includes:
a second resistor configured to receive the voltage generated by the shaft position detector at one end of the second resistor, and
a second capacitor connected to the other end of the second resistor at one end of the second capacitor and connected to a ground terminal at another end of the second capacitor, and
wherein the feedback voltage is output at a node to which the another end of the second resistor and the one end of the second capacitor are connected.

8. The headlamp leveling device of claim 7, wherein: the second resistor has a resistance value corresponding to a resistance value of the first resistor, and
the second capacitor has a capacitance value corresponding to a capacitance value of the first capacitor.

9. The headlamp leveling device of claim 3, wherein the hysteresis device includes a resistor configured to receive a smoothed voltage from the voltage smoothing device at one end of the hysteresis device and output the control voltage at another end of the hysteresis device.

10. The headlamp leveling device of claim 1, wherein the first direction and the second direction are opposite to each other.

11. The headlamp leveling device of claim 1, wherein the shaft position detector is configured to:
generate a voltage with a higher voltage level as the shaft moves in a first direction, and
generate a voltage with a lower voltage level as the shaft moves to a second direction.

12. The headlamp leveling device of claim 11, wherein: the shaft position detector includes a variable resistor having a resistance value that varies according to movement of the shaft,
a power voltage is applied to one end of the variable resistor, and
the variable resistor is connected to a ground terminal at another end of the variable resistor.

13. A headlamp leveling method comprising:
generating a control voltage based on a pulse provided from a vehicle system;
generating a feedback voltage according to a position of a shaft;
controlling rotation of a motor by comparing a voltage level of the feedback voltage and a voltage level of the control voltage; and
allowing the position of the shaft to be changed, according to the rotation of the motor,
wherein the controlling of the rotation of the motor includes:
comparing the voltage level of the feedback voltage and the voltage level of the control voltage,
rotating the motor in a first direction when the voltage level of the control voltage is higher than the voltage level of the feedback voltage, and
rotating the motor in a second direction when the voltage level of the control voltage is lower than the voltage level of the feedback voltage.

14. The headlamp leveling method of claim 13, further comprising:
allowing a light-illumination angle of a headlamp to be changed, according to the position of the shaft.

15. The headlamp leveling method of claim 13, wherein the generating of the control voltage includes:

generating a voltage based on a high period of the pulse, smoothing the voltage by removing variability of the voltage, and outputting, as the control voltage, a voltage obtained by adding a hysteresis component to the voltage that has been smoothed.

16. The headlamp leveling method of claim 13, wherein the first direction and the second direction are opposite to each other.

17. The headlamp leveling method of claim 13, wherein the generating of the feedback voltage includes:

increasing the voltage level of the feedback voltage as the shaft moves in a first direction, and decreasing the voltage level of the feedback voltage as the shaft moves in a second direction, wherein the first direction and the second direction are opposite to each other.

* * * * *